United States Patent [19]
Gabor

[11] 3,954,163
[45] May 4, 1976

[54] HIGH SPEED PRINTER WITH INTERMITTENT PRINT WHEEL AND CARRIAGE MOVEMENT

[75] Inventor: Andrew Gabor, Alamo, Calif.

[73] Assignee: Xerox Corporation, Stamford, Conn.

[22] Filed: Sept. 11, 1974

[21] Appl. No.: 505,105

Related U.S. Application Data

[63] Continuation of Ser. No. 394,072, Sept. 4, 1973, abandoned, which is a continuation-in-part of Ser. Nos. 229,314, Feb. 25, 1972, abandoned, and Ser. No. 157,283, June 28, 1971, Pat. No. 3,839,665, which is a continuation-in-part of Ser. No. 23,569, March 30, 1970, abandoned.

[52] U.S. Cl. .............................. 197/53; 101/93.19; 318/603; 318/618
[51] Int. Cl.² .......................................... B41J 1/32
[58] Field of Search ........................ 197/18, 49, 53; 101/93.15, 93.16, 93.17, 93.18, 93.19; 318/603, 608, 616–618, 660, 669, 661, 604, 18, 19

[56] References Cited
UNITED STATES PATENTS

| | | | |
|---|---|---|---|
| 3,461,235 | 8/1969 | Willcox et al. | 101/93.15 X |
| 3,462,663 | 8/1969 | Schiller | 318/18 |
| 3,512,060 | 5/1970 | Floyd | 318/604 X |
| 3,539,897 | 11/1970 | Sommeria | 318/618 |
| 3,564,379 | 2/1971 | Bakel et al. | 318/603 |
| 3,571,685 | 3/1971 | Akins et al. | 318/603 |
| 3,599,068 | 8/1971 | Kanamori et al. | 318/603 |
| 3,602,700 | 8/1971 | Jerva et al. | 318/603 X |
| 3,641,535 | 2/1972 | Knopf | 318/603 X |
| 3,665,280 | 5/1972 | Payne et al. | 318/603 X |
| 3,704,667 | 12/1972 | Moss | 101/93.19 X |

*Primary Examiner*—Edgar S. Burr
*Assistant Examiner*—R. T. Rader
*Attorney, Agent, or Firm*—John E. Beck; Terry J. Anderson; Barry P. Smith

[57] ABSTRACT

A high-speed printer with a printing wheel with the individual type elements supported by radially extending spokes. Separate servo systems provide intermittent movement for the printing wheel and the carriage carrying the printing wheel.

10 Claims, 23 Drawing Figures

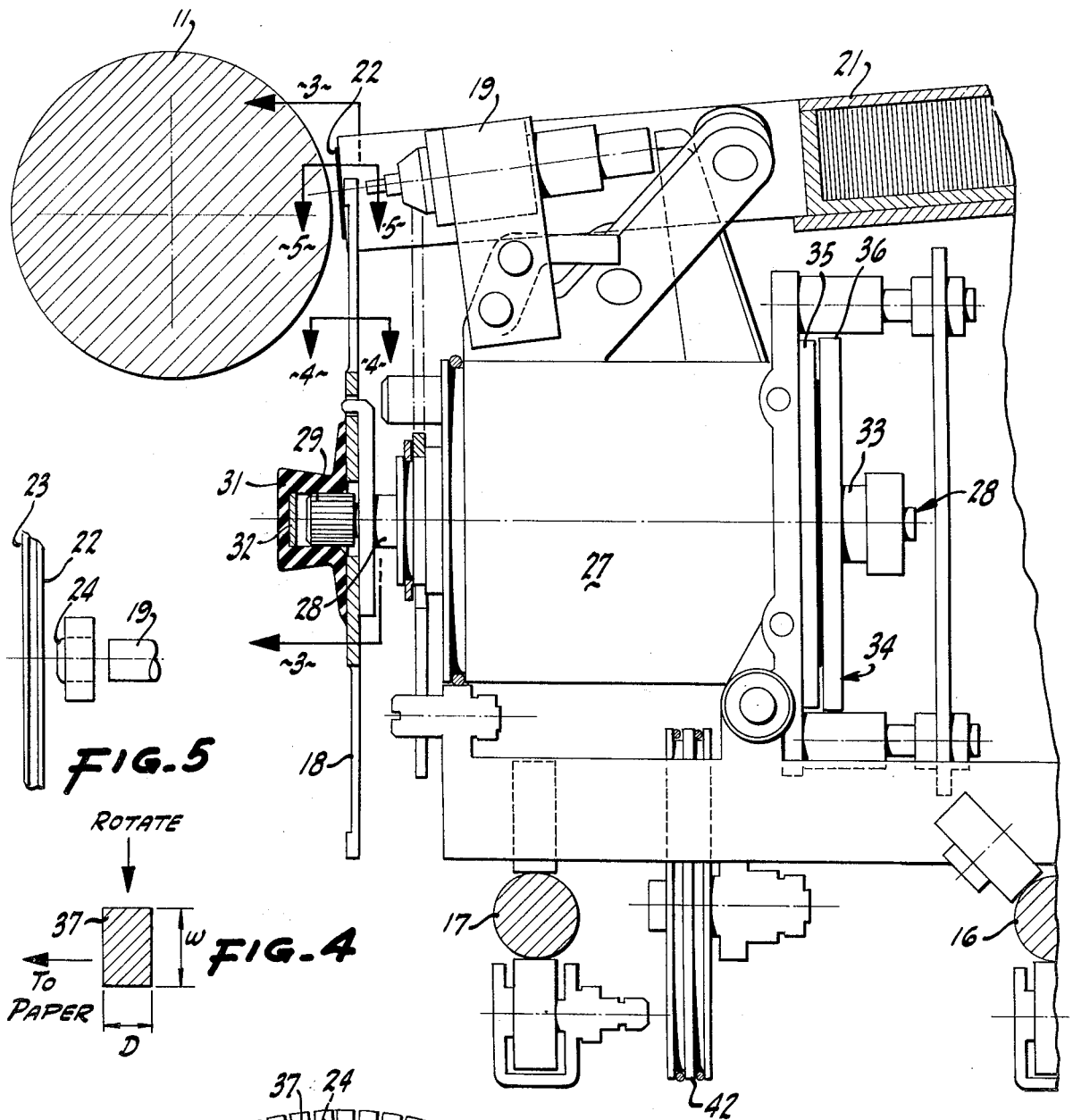

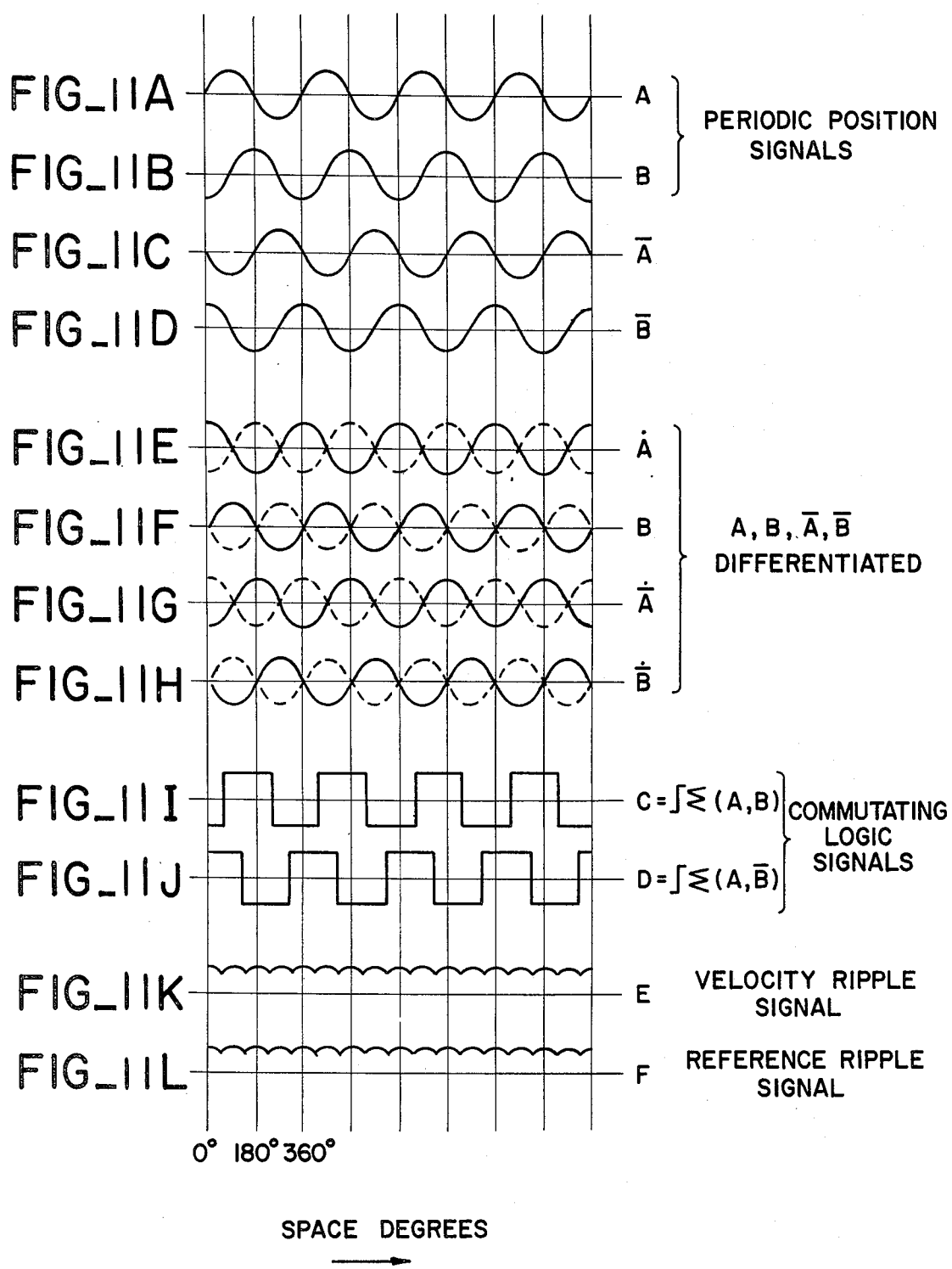

HIGH SPEED PRINTER WITH INTERMITTENT PRINT WHEEL AND CARRIAGE MOVEMENT

CROSS-REFERENCE TO RELATED APPLICATION

This application is a continuation of application Ser. No. 394,072 filed Sept. 4, 1973 and now abandoned, which is in turn a continuation-in-part of two copending applications, i.e. application Ser. No. 229,314 filed Feb. 25, 1972 for "HIGH SPEED PRINTER WITH INTERMITTENT PRINT WHEEL AND CARRIAGE MOVEMENT" and now abandoned, and application Ser. No. 157,283 filed June 28, 1971 for "APPARATUS FOR THE MEASUREMENT OF RELATIVE VELOCITY BETWEEN TWO RELATIVELY MOVABLE MEMBERS" and now issued as U.S. Pat. 3,839,665, which latter application is in turn a continuation-in-part of application Ser. No. 23,569 filed Mar. 30, 1970 for "APPARATUS FOR THE MEASUREMENT OF RELATIVE VELOCITY BETWEEN TWO RELATIVELY MOVABLE MEMBERS" and now issued as U.S. Pat. 3,839,665, which latter application is in turn a continuation-in-part of application Ser. No. 23,569 filed Mar. 30, 1970 for "APPARATUS FOR THE MEASUREMENT OF RELATIVE VELOCITY BETWEEN TWO RELATIVELY MOVABLE MEMBERS" and now abandoned.

BACKGROUND OF THE INVENTION

The present invention relates to a high-speed printer with intermittent print wheel and carriage movement.

With the advent of computer systems the need for a compact reliable printer with high quality printing is apparent. Prior devices such as input/output printers suitable for interfacing with computers are either mechanically complex, low speed, or do not provide quality printing.

Another type of high-speed printer employs a character wheel carrying the type elements at the outer periphery of respective spokes forming the wheel. In such apparatus, the character wheel is rotated continuously while the carriage carrying the wheel is advanced intermittently, or, as disclosed in U.S. Pat. No. 3,356,199, continuously. In any case, the foregoing necessitated printing "on-the-fly." Thus, during fast printing, meaning rapid rotation of the character wheel, the spoke must deflect while the hammer is in contact with the type element. Such deflection causes fatigue failure of the spoke. On the other hand, if the spokes are made thinner to reduce fatigue, then accurate registration or quality of printing is sacrificed.

OBJECTS AND SUMMARY OF THE INVENTION

It is, therefore, an object of the present invention to provide a high-speed printer which is mechanically simple but produces high quality printing.

In accordance with the above object there is provided a carriage; a print wheel rotatably mounted to the carriage and including a plurality of character elements; first drive means coupled to the print wheel for rotating the print wheel to a desired rotational position in order to place a selected character element at rest in a printing position adjacent a record medium to be printed upon; print hammer means mounted on the carriage and adapted to impact a selected character element while the character element is at rest in a printing position in order to print on the record medium; second drive means coupled to the carriage for moving the carriage linearly along a predetermined path whereby the print wheel and hammer means are caused to move to printing positions along such path; and servo control means coupled to the first drive means for controlling the rotation of the wheel, the servo control means including means coupled to the print wheel for generating a position signal indicative of the rotational position of the print wheel, means responsive to the rotation of the print wheel for generating a velocity signal indicative of the instantaneous velocity of the print wheel, and means coupled to the means for generating a position signal and the means for generating a velocity signal for energizing the first drive means first in accordance with the velocity signal until the print wheel is driven to a predetermined rotational position relative to the desired rotational position and then in accordance with the position signal and the velocity signal as the print wheel is driven further to the desired rotational position.

BRIEF DESCRIPTION OF THE DRAWINGS

FIG. 2 is an enlarged cross-sectional view taken along line 2—2 of FIG. 1;

FIG. 3 is a cross-sectional view taken along line 3—3 of FIG. 2;

FIG. 4 is an enlarged cross-sectional view taken along line 4—4 of FIG. 2;

FIG. 5 is an enlarged view taken substantially along the line 5—5 of FIG. 2;

FIGS. 11A through 11L are curves useful in understanding the circuit of FIG. 7.

DETAILED DESCRIPTION OF THE PREFERRED EMBODIMENT

Figure 1:
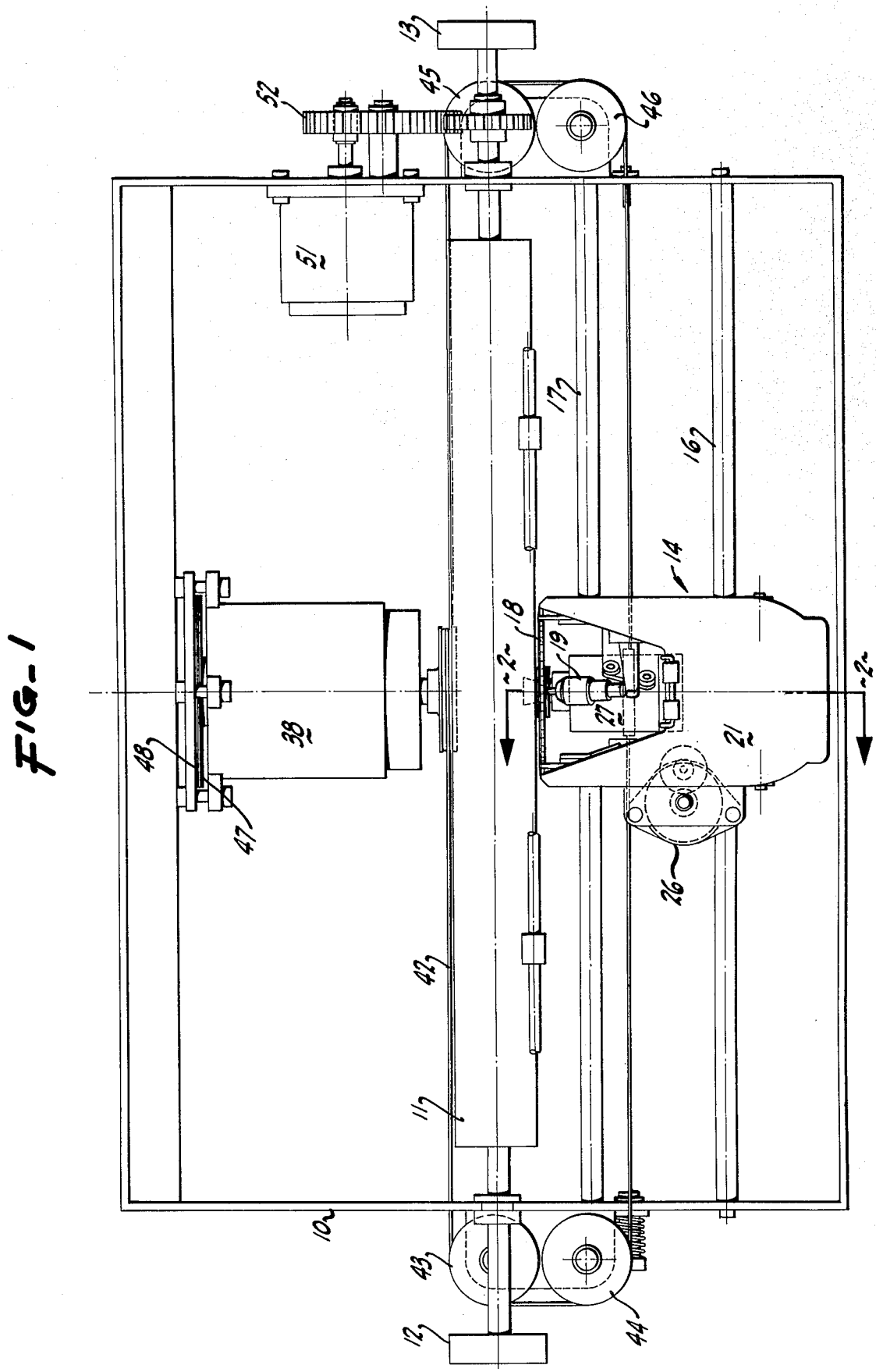
FIG. 1 is a plan view of a printer embodying the present invention.

Referring now to FIG. 1, an overall view of the printer is illustrated. Mounted on a frame 10 is a platen 11 with knobs 12 and 13 for rolling the platen 11 and the paper wrapped thereon. A carriage 14 is mounted for linear movement on the rods 16 and 17 attached to frame 10. Carriage 14 includes a rotary wheel 18 on which are a number of type elements, a hammer assembly 19 for striking a selected element which is better shown in FIG. 2, a ribbon cartridge 21 having an inked ribbon 22 interposed between a type element 24 and the paper 23 to be printed upon as best shown in FIG. 5. Ribbon 22 is advanced as illustrated in FIG. 1 by a stepping motor 26. Details of the ribbon cartridge 21 are more fully shown in a copending patent application entitled "Ribbon Cartridge" filed Feb. 25, 1972, Ser. No. 229,396.

Still referring to FIGS. 1 and 2, carriage 14 also includes a motor 27 having a shaft 28. Mounted on one end 29 of the shaft is the rotary wheel 18. Wheel 18 includes a central hub portion of 31 constructed of rubber with a stiffening ring 32 which allows the wheel 18 to be easily removed from shaft end 29 and, for example, replaced with another wheel with, for example a different font of characters. The other end 33 of shaft 28 has mounted thereon a transducer which provides position signals related to the rotary positions of the shaft and therefore of the print wheel 18. Transducer 34 includes a fixed disk 35 adjacent a disk 36 mounted for rotation with shaft 28. Electrical interaction between these two disks 35 and 36 produces the position signals which, was will be discussed below, are used in a servo system for controlling the print wheel 18. In general, disks 33 and 34 include a plurality of substantially parallel conductors on their surfaces with one of the disks being supplied a high frequency signal from an oscillator. This signal is coupled to the other disk to provide position signals from which the position and velocity of the shaft 28 and its printing wheel 18 can be ascertained as more fully discussed in conjunction with FIG. 7. Details of such transducers and associated servo systems are disclosed and claimed in a copending application Ser. No. 157,283 filed June 28, 1971, entitled "Apparatus for the Measurement of Relative Velocity Between Two Relatively Movable Members," by Andrew Gabor and assigned to the present assignee.

Print wheel 18 is illustrated in greater detail in FIG. 3 and consists of a plurality of substantially identical spokes 37, each spoke extending from a central hub 38 with each spoke carrying a type element 24. A typical cross section of a spoke is illustrated in FIG. 4. A typical depth dimension in a direction toward paper 23 is 0.030 inches and width dimension in the direction or rotation of the wheel is 0.040 inches. Such cross section provides, as is apparent, greater flexibility in the direction of the axis of rotation, or in other words, toward the paper to be printed upon and relatively more rigidity in the direction of rotation of the printing wheel itself. This construction provides for a better dynamic registration of the printed characters and thus for a higher quality of printing. The spokes 37 are made with a 33% glass filled nylon material. This percentage of glass is believed to provide for longest life of the wheel 18 while at the same time minimizing fatigue failures. In addition, the foregoing width and depth dimensions are believed to be ideal. For example, in the case of the width dimension, while a greater dimension than 0.040 inches would provide for more rigidity, it would add a greater weight to wheel 18, thus making its rapid movement more difficult. In the case of the depth dimension of 0.030 inches, if this dimension is reduced significantly, the hammer action on the type element would tend to break the spoke. On the other hand, if it is increased above 0.030 inches, fatigue fracture may occur in a short period of time. In any case, for good character registration, the width dimension should be large enough for proper rigidity. Such a cross sectional configuration would not, of course, be possible in accordance with the teachings of the prior art, since with continuous rotation of the printing wheel, there must be flexibility in the rotary or width direction. However, with the intermittent motion of print wheel 18 provided by the present invention, this is not necessary.

Referring again to FIG. 1, the motion of carriage 14 is provided by a carriage motor 38 mounted to frame 10. Motor 38 has a shaft 39 with a pulley 41 mounted on one end of the shaft with a number of grooves in it for driving a cable 42 which is coupled to carriage 14. The coupling is accomplished through pulleys 43, 44, 45 and 46. Details of this pulley and cable arrangement are illustrated and claimed in a copending application entitled "High Speed Printer With Drift Compensated Cable for Carriage," filed Feb. 25, 1972, Ser. No. 229,397.

The other end of shaft 39 of motor 38 has mounted on it for rotation a disk 47 which interacts electrically with a fixed disk 48 to provide for the position of shaft 29 and the position of carriage 14. Transducer 47, 48 is substantially identical to transducer 34 of the print wheel.

In order to feed paper automatically, a paper feed motor 51 is fixed to frame 10 and drives the platen 42 through the gear train 52. Motor 51 is a stepping motor and is capable of advancing the paper in multiples of 1/48 of an inch. Details of the paper feed arrangement are disclosed and claimed in a copending application in the names of Sin Lin Lee and Einar Asbo entitled "Paper Feed System for High Speed Printer," Ser. No. 229,446 filed Feb. 25, 1972.

Figure 6:
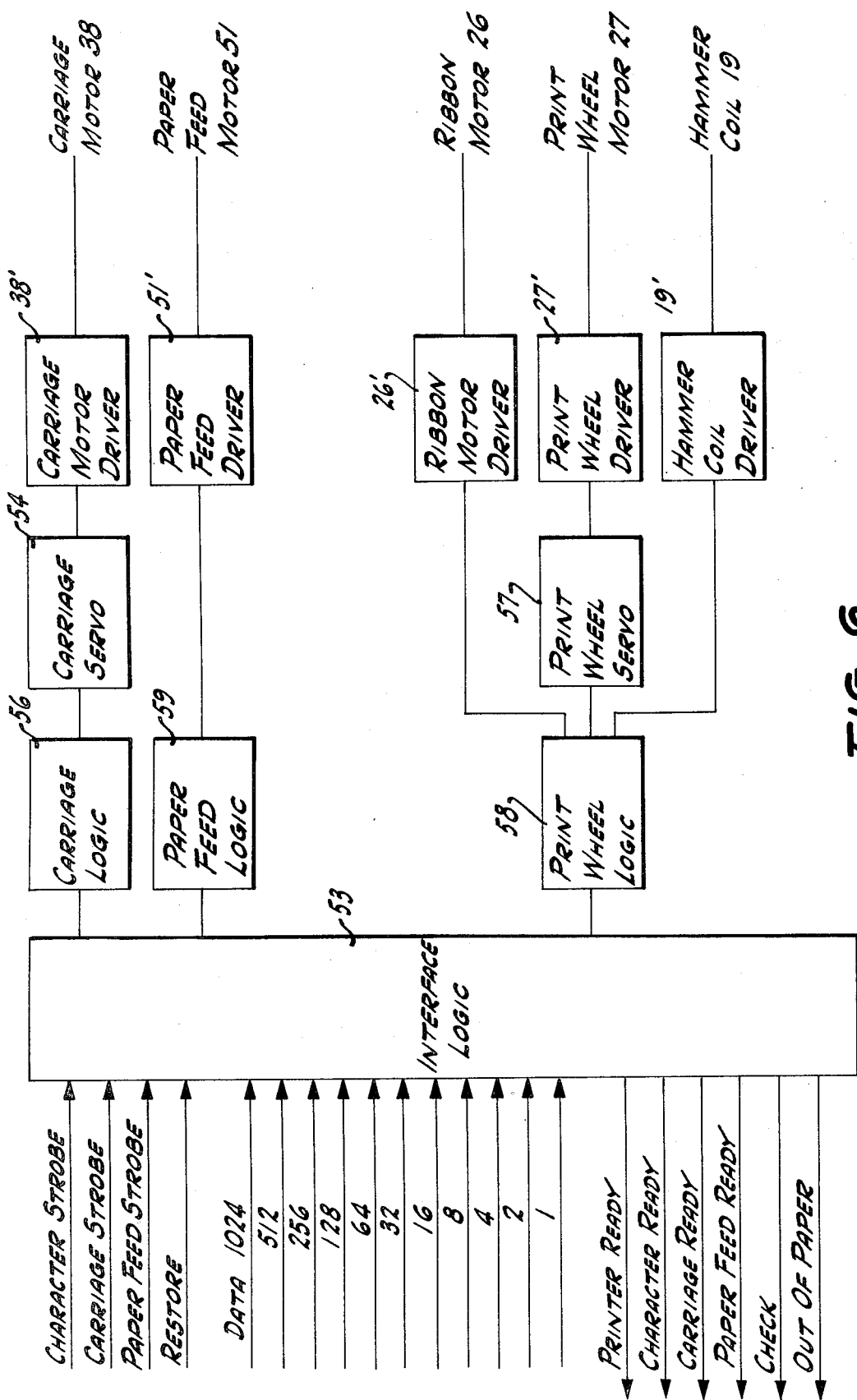
FIG. 6 is a block diagram of the control circuit used with the printer.

The logic circuit for driving all of the various motors illustrated in FIGS. 1 and 2 is shown in FIG. 6. Interface logic unit 53 has various input and output interface lines coupled from a computer (not shown) to carriage motor 38, paper feed motor 51, ribbon motor 26, print wheel 27 and the hammer coil for hammer 19. All of these motors and coils are driven by the appropriately labeled drivers, which are designated with a similar prime numbers. Carriage motor driver 38' includes a carriage servo unit 54, which of course includes the transducer 47, 48 and a carriage logic unit 56. Similarly, the print wheel motor 27 circuitry includes a print wheel servo unit 57, which includes its transducer 34, which is coupled to print wheel logic 58. Print wheel logic 58 also drives the ribbon motor driver 26' and a hammer coil driver 19'. A paper feed logic unit 59 is provided for paper feed driver 51'. As a data input to interface logic unit 53, there are eleven data lines designated with the decimal equivalent of their binary weight which contain binary coded information for print wheel movement, a carriage movement command, or a paper feed command. An ASCII character code uses only the seven lower order lines for the purpose of choosing the appropriate character to be printed by print wheel 18.

In the case of a carriage movement command, the ten lower order bits designate the distance the carriage is to be moved in multiples of 1/60 of an inch, or 1/6 of a character. The high order bit determines direction of travel.

If the input data represents a paper feed command, the ten lower order bits designate the number of vertical positions in multiples of 1/48 of an inch, or ⅛ of a print line advance, which the paper is to be moved by the paper feed motor 51. The high order bit determines the direction of travel, either upwards or downwards. The other input lines function as follows:

| | |
|---|---|
| Character Strobe | A signal used to sample the seven bit ASCII character code. |
| Carriage Strobe | A signal used to sample the eleven bit carriage movement command. |
| Paper Feed Strobe | A signal used to sample the eleven bit paper feed command. |
| Restore Printer | A signal which causes the printer to perform a restore sequence which consists of positioning the carriage at the leftmost print column, resynchronizing the print wheel and resetting all the registers |

-continued
and flip-flops in the printer logic.

The basic output lines of interface logic unit 53 are as follows with their functions indicated:

| | |
|---|---|
| Printer Ready | A line indicating that the printer is properly supplied with power. |
| Character Ready | A signal which indicates that the printer is ready to accept a new character command. |
| Carriage Ready | A signal which indicates that the printer is ready to accept a new carriage movement command. |
| Paper Feed Ready | A signal which indicates that the printer is ready to accept a new paper feed command. |
| Check | A signal which indicates that due to a machine malfunction, a previously received command has not been properly executed. When a check condition has been detected, the only command that will be accepted by the printer is "Restore Printer" which will clear the check condition unless the malfunction is such as to prohibit it. |
| Paper Out | A signal which indicates that the printer is out of paper. This condition is monitored by a micro switch installed in the cover of the printer, if no switch is installed this line will always indicate out of paper. |

Figure 7:
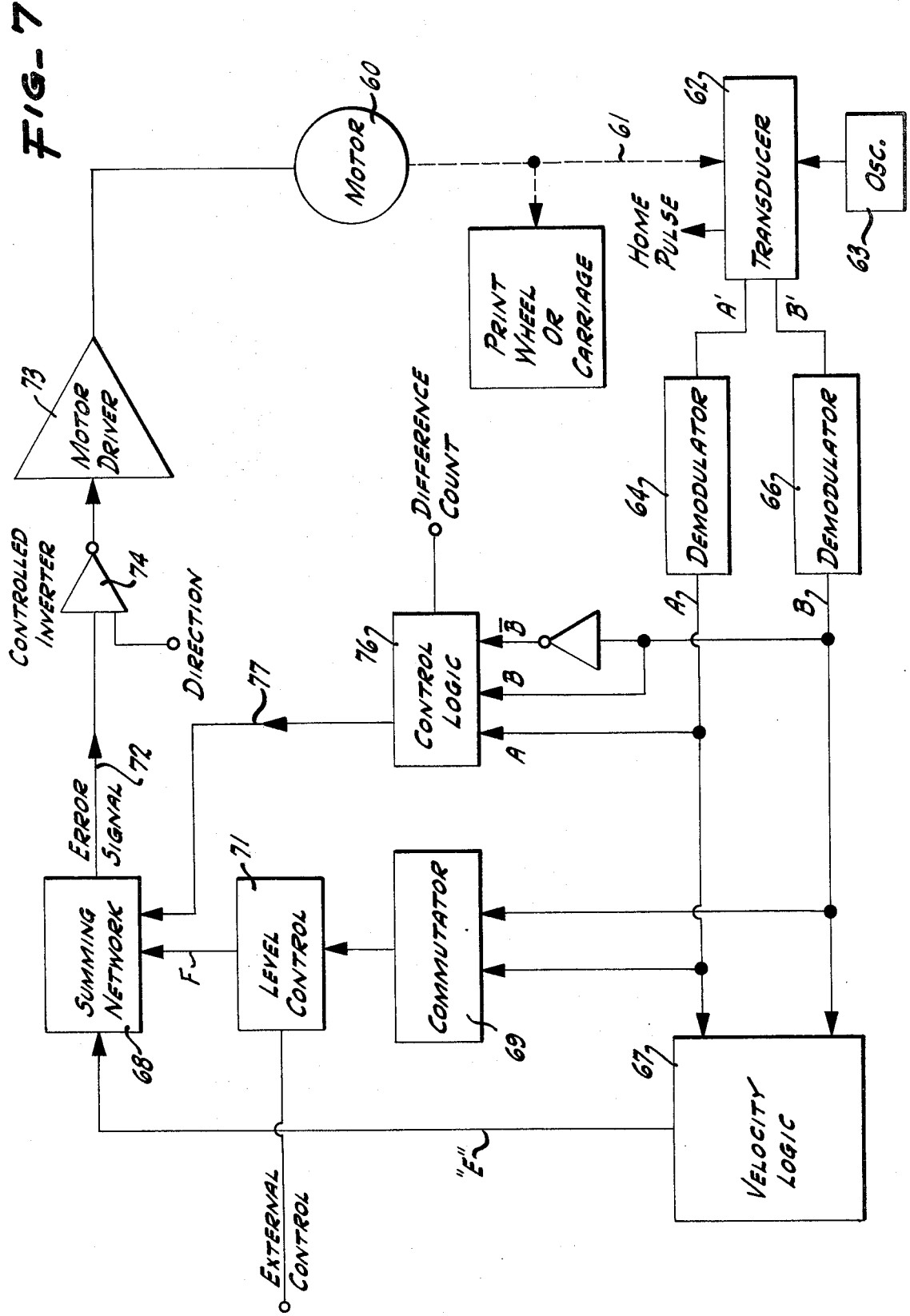
FIG. 7 is a more detailed block diagram of a portion of the circuit of FIG. 6.

FIG. 7 illustrated both the carriage servo system 54 of FIG. 6 and the print wheel servo system 57. Thus, the motor 60 illustrated in FIG. 7 will refer both to the carriage motor 38 and the print wheel motor 27. However, the servo system for the print wheel requires a slightly modified FIG. 7, which will be discussed in conjunction with FIG. 8. In general, the block diagram for FIG. 7 shows a circuit which illustrates the velocity and/or position control of motor 60 in accordance with the principles disclosed in the above-mentioned copending application Ser. No. 157,283. Also disclosed is a technique for bringing motor 60 to a stop at a predetermined rotary position as is now fully disclosed and claimed in an application Ser. No. 71,984, filed Sept. 14, 1970 in the name of Andrew Gabor entitled "Apparatus For Controlling the Relative Position Between Two Relatively Movable Members," and also assigned to the present assignee, and now U.S. Pat. No. 3,663,880 issued May 16, 1972. That patent is concerned with a disk drive system. An external reference position signal applied to the servo system as a "difference count" indicated to the control system the number of tracks of the memory disk it must pass over to the next stopping point. Similarly, the same system can be used in the printer of the present invention to indicate by means of a difference count the number of carriage printing positions through which the carriage must be moved to the next printing position, or alternatively, the number of character elements on the print wheel which must be rotated through to properly position the next type element or character to be printed.

Referring in detail to FIG. 7, the motor 60 is indicated as driving a shaft 61 which may be coupled either to the print wheel or carriage. Shaft 61 is also coupled to a transducer 62 which as discussed above consists of a fixed and a rotary disk. In general, each disk includes deposited metallic parallel conductors with each conductor carrying current in a direction opposite to the adjacent conductor. One of the disks is coupled to the oscillator 63. Relative movement of one disk with respect to the other produces electrical interaction to produce two position signals, A' and B'. These are demodulated by demodulators 64 and 66 to produce A and B position signals. As disclosed in the copending application Ser. No. 157,283, these signals are coupled to a velocity logic unit 67 to produce a velocity signal designated E. This is derived as discussed in the above copending application from position signal A and B which are inverted, differentiated and commutated by logic unit 67. Signal E is coupled directly to a summing network 68.

A velocity reference signal F is also provided, as disclosed in the above application, from position signals A and B by means of a commutator unit 69 which is coupled to summing network 68 through level control unit 71. As disclosed in application Ser. No. 157,283 the level control unit consists of a number of parallel field effect transistors which are regulated by the external control input to control the level of the reference signal F applied to summing network 68 and therefore the speed of motor 60.

It is apparent that a difference between the reference signal F and the velocity signal level E produces an error signal on line 72 to cause a motor driver unit 73 to drive motor 60 accordingly. A controlled inverter 74 is responsive to a direction input to rotate drive motor 60 in either a clockwise or counter-clockwise direction.

In order to bring motor 60 to stop at a predetermined position to stop the carriage or print wheel as the case may be, a control logic unit 76 is provided which is coupled to the A and B position signals and also as coupled to an inverted B̄ signal. The output line 77 of control logic unit 76 is coupled to summing network 68. In accordance with patent application Ser. No. 71,984 and now U.S. Pat. No. 3,663,880, a difference count, applied to control logic unit 76, will cause motor 60 to stop when it has moved a number of units corresponding to this difference count. Specifically, during the time the velocity of motor 60 is at its lowest level, control logic unit 76 closes a homing region switch which couples position signal A to summing network 68. Thus, referring to FIG. 6, the carriage logic unit 56 would instruct the carriage to move a certain number of spaces, depending on where the next character was to be printed, and this would be the difference count input. Also, as discussed above, the direction of movement would be inputed via the data lines and more specifically the highest order bit and this would be coupled to the direction input of inverter 74. It is obvious, of course, that there are other modes in which the direction could be accomplished, such as by the inversion of the reference signal F from commutator 69.

Figure 8:
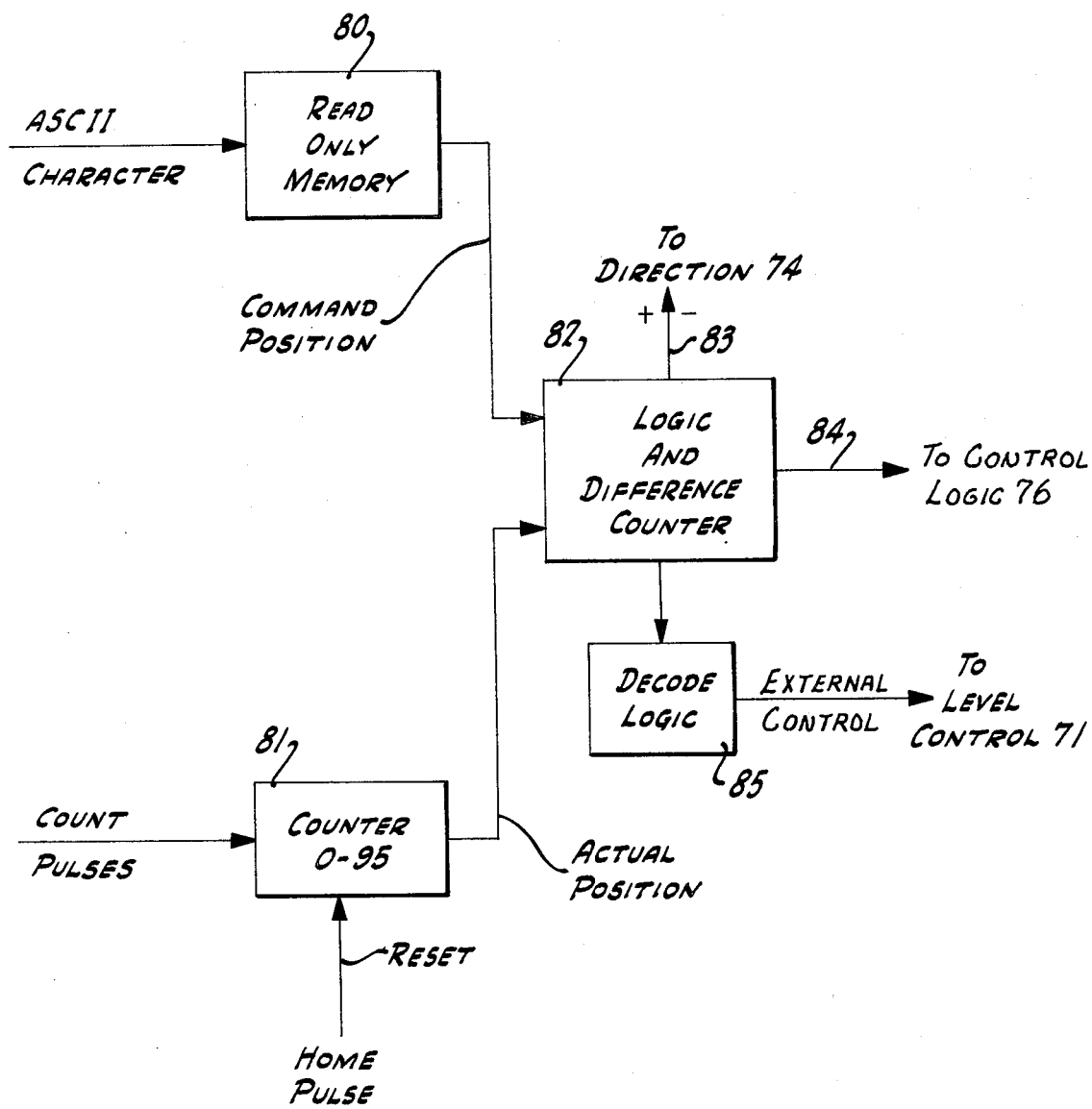
FIG. 8 is a more detailed block diagram of another portion of the circuit of FIG. 6.

However, as discussed above, in the case of the print wheel 18 it is desirable that the wheel be rotated the shortest distance of rotation from its actual position to its next or commanded position. FIG. 8 illustrates a circuit which accomplishes the foregoing; this circuit is a portion of the print wheel logic 58 of FIG. 6 and is a modification of FIG. 7. Referring both to FIGS. 6 and 8, the ASCII characters received on the input data lines of interface logic unit 53 are stored in a read only memory 80. This memory converts a ASCII character to a specific character position of the wheel. The wheel may have 96 character positions; for example, a position 20 would be the letter $i$ in the preferred embodiment. A 0–95 counter 81 is incremented by a count pulse input each time the print wheel is rotated one character position. These count pulses may be easily derived from the control logic unit 76. A home pulse input is provided which is obtained from the transducer unit 62 by, for example, providing a magnet mounted on the movable disk (for the print wheel servo) at a zero position, the magnet being sensed by an appropriate sensor. This home pulse resets the counter for each revolution of the print wheel. The output of counter 81 provides the actual position of the print wheel. A logic and difference counter unit 82 performs two alternative functions. In effect, it operates on a modulus 96. Logic unit 82 subtracts either the actual position from the command position to provide one direction of movement or the command position from the actual position to indicate an opposite direction of movement on the line 83 which would be coupled with the direction input of controlled inverter 74 of FIG. 7. The output of logic unit 82 on line 84 is a velocity command to the servo system which would be an input to control logic 76. Thus, FIG. 8 amounts to a slight modification of FIG. 7 in the use of the difference count. The external level control coupled to level control unit 71 of FIG. 7 is obtained from the difference counter 82 by the decode logic unit 85 which provides the external level control. In essence, the decode logic senses the magnitude of the difference between the actual and command positions and adjusts the level proportionately to provide proper acceleration and deceleration. As discussed previously, these levels in fact are controlled by various field effect transistors inserting resistors in the level control circuit. As an example of the operation of the modulus 96 difference counter 82, assuming the command position was 50 and the actual position 42, the difference counter would produce a difference of 8. In modulus 96, subtracting the command of 50 from the actual position of 42 would produce a difference of 88 which would be rejected by the logic. In other words, the logic is set up so as to reject any number greater than 48, since 48 is half of 96. Details of the foregoing are disclosed and claimed in copending application Ser. No. 270,178, filed July 10, 1972, in the name of Willy J. Grundherr, entitled "Control Logic for Print Wheel and Hammer of High Speed Printing Apparatus."

Figure 10:
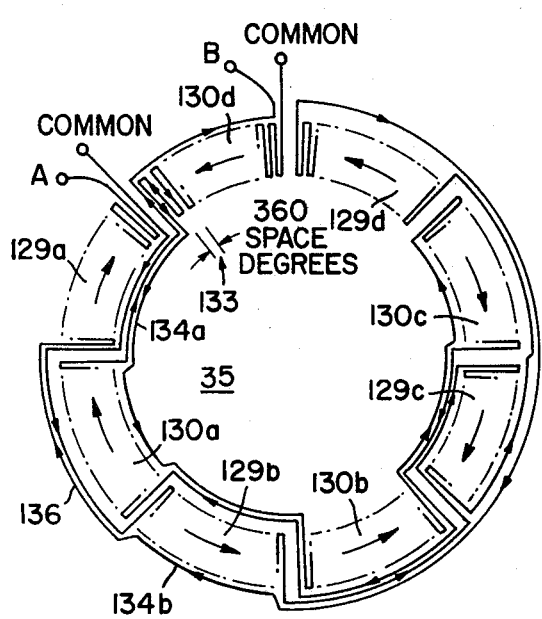
FIG. 10 is a plan view of another set of windings used in the present invention.
Figure 9:
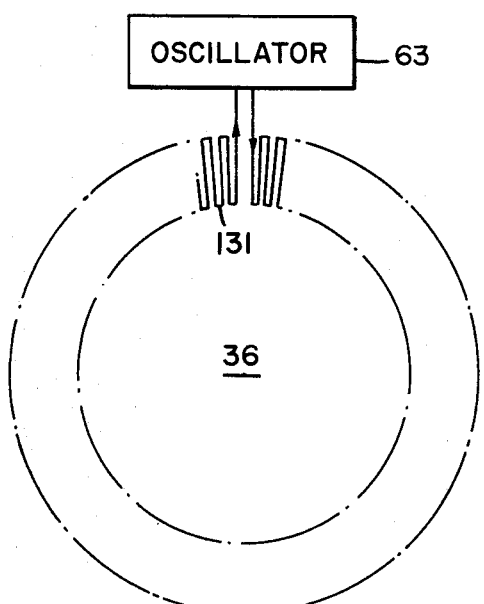
FIG. 9 is a plan view of a winding used in the present invention.

The movable and fixed portions of transducer 62 are illustrated in FIGS. 9 and 10, respectively. Movable portion 36 (FIG. 2) includes a winding 131 which has a plurality of substantially parallel conductors arranged in a circular array each series connected to the next adjacent conductor whereby adjacent conductors of the winding carry current in opposite directions. The circular array is concentric with the axis of rotation. A high frequency oscillating carrier signal is applied to winding 131 by means of the oscillator 63. Movable portion 36 in actual practice has an insulating disk having the winding 131 deposited on it in the form of metallic layer which is then fixed to shaft 28 for rotation.

FIG. 10 illustrates the fixed portion 35 of transducer 62 which consists of a circular array of parallel conductors similarly arranged to those of movable portion 36. However, portion 35 includes two sets of segmental windings 129 and 130 in space quadrature; in other words, a 90° space difference. In the context of the present invention, space degrees are defined as the distance between conductors with currents flowing the same direction as shown at 133. Winding 129 consists of a set of four segments 129a through d and winding 130 consists of segments 130a through d. The direction of current flow in each winding is at any instant of time indicated by the arrows shown in the phantomed portion of the windings. Thus, winding 129 is shifted from winding 130 by 90 space degrees.

The windings on movable and fixed portions 36 and 35 are juxtaposed so that they face each other as illustrated in FIG. 2. Winding 131 (FIG. 9) by reason of the high frequency signal imposed on the winding produces a voltage in both windings of FIG. 10, specifically windings 129 and 130. In this respect, the two sets of windings act as a transformer. Relative movement of one of the windings with respect to the other produces a change in the output signals A' and B' of terminals A and B. Such output signals A' and B' are in the form of modulated carrier signals having as a carrier frequency the signal generated by oscillator 132. Their envelopes contain information as to both the displacement position of one winding with respect to the other, or in other words, the rotation position of shaft 28, along with velocity information. The position signals A and B as shown in FIG. 11A and 11B which are cyclic or alternating electric signals are actually the demodulated envelopes of the signal A' and B' (see FIG. 7).

Generation of a position signal by the foregoing means is well known in the art. Basically, the position signal senses rotation by reason of the fact that when a conductor of one windings is equidistant from the two conductors of the facing winding a null will be produced. Similarly, maximum positive and negative peaks will be produced during alignment of one conductor of one winding with the conductor of the juxtaposed winding. In this manner as illustrated in FIGS. 11A and 11B the periods of the position signal are therefore inversely proportional to the relative velocity between the two windings or the absolute velocity of the shaft. In other words, more rapid rotation of the one member with respect to the other will cause a greater number of alternation in the same time interval. It is also apparent that the total rotary displacement of the shaft may be determined by counting the number of alternations. Thus, the slope of the position signals at their zero crossings are proportional to instantaneous relative velocity.

Referring now specifically to the windings 129 and 130, in accordance with the present invention each windings includes four segments designated a through d with the segments in space opposition or 180°. This is apparent by the arrows associated with each windings segment. However, they are electrically interconnected to produce aiding signals. All of the windings are in a common plane. Winding 129 is electrically independent of winding 130 since they produce separate output signals at terminals A and B.

Figure 12:
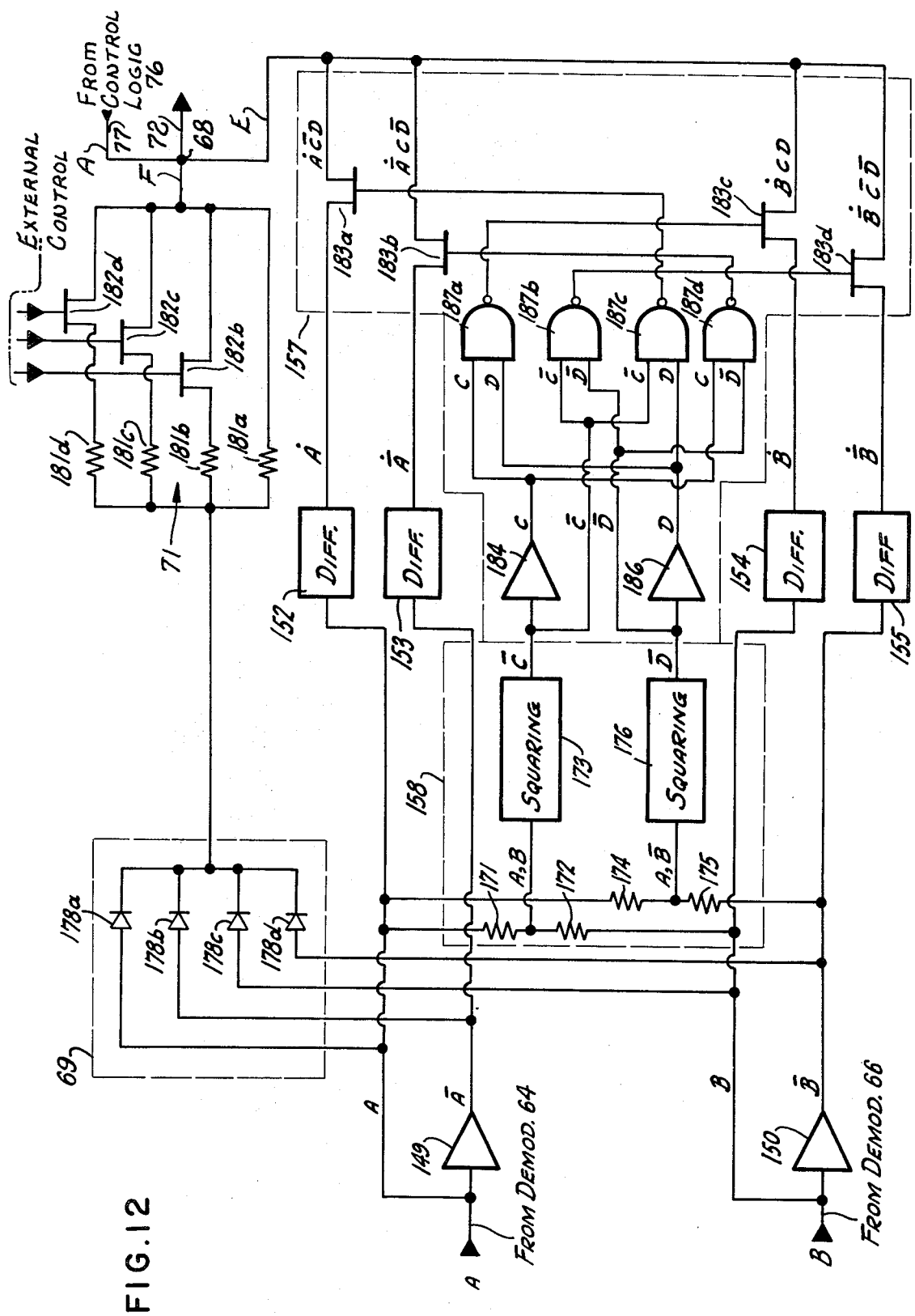
FIG. 12 is a more detailed circuit diagram of a portion of FIG. 7.

More specifically and anow also referring to FIG. 12 which is more detailed than FIG. 7, the A' and B' outputs of transducer 62 are respectively coupled to demodulators 64 and 66 which produce a demodulated A and B signal as shown in FIGS. 11A and 11B. These are shifted 90 space degrees from one another. The outputs of demodulators 64 and 66 are coupled to inverters 149 and 150 which provide $\overline{A}$ and $\overline{B}$ signals which have been inverted as best shown in FIGS. 11C and 11D. All four signals, A, B, $\overline{A}$ and $\overline{B}$ are coupled to their respective differentiators 152, 153, 154 and 155. The outputs of the differentiators 152 through 155 is shown respectively in FIGS. 6E and 6H. The dashed waveforms would be present for the reverse direction of rotation. In the idealized case where the position signals are sine waves, the differentiated signals, of course, will also be sine waves but displaced by 90°. However, the differentiation is carried on in accordance with time and therefore the peak amplitudes of the differentiated signals is equal to the slope of the position signals at their zero crossing. Thus, the signals of FIGS. 6E through 6H are velocity signals.

The commutating signal generator 158 which is a portion of velocity logic 67 performs the functions as illustrated in FIGS. 11I and 11J of summing both the A and B and the AB̄ signals from demodulators 64 and 66 and their associated inverters 149 and 150. The A and B signals are summed by resistors 171 and 172 with their common junction coupled to a squaring circuit 173 such as a Schmitt trigger. Similarly, resistors 174 and 175 are coupled to the A and B̄ lines respectively with their common junction coupled to a squaring circuit 176. Squaring circuits 173 and 176 provide C̄ and D̄ outputs which are coupled to the commutator block 157 which is also a portion of velocity logic 67.

Commutator 69 is a simple OR gate including the diodes 178a–d. The output of the OR gate 69 provides a reference signal which is directly derived from the maximum amplitudes of the position signals. As is apparent from inspection of the waveforms of FIG. 11, the OR gates provide a transition between maximum amplitudes at the 45° points of the waveform. These 45° points are the same points provided by the commutating logic signals C and D in FIGS. 11I and 11J.

The level control 71 is essentially a resistive attenuator where the various resistors 181a through 181d may be selectively connected in parallel by the associated field effect transistors 182b, 182c and 182d. These field effect transistors would be driven by the external control as illustrated in FIGS. 7 and 8.

Block 157 is a commutator which provides the velocity ripple signal, E. It includes four field effect transistors 183a–d with their source terminals respectively coupled to the output differentiators 152 through 155. Gating of field effect transistors 183a–d is provided by the C̄, D̄ signals from commutating signal generator 158. This gating gates in the most positive amplitude of the signals of FIG. 11C through 11H. The specific gate inputs for these field effect transistors are derived from inverters 184 and 186 which provide C and D signals in addition to the existing C̄, D̄ signals, and AND gates 187a through 187d which have as inputs the commutating signals arranged in such a manner as to provide the logic terms illustrated. All of these output terminals of field effect transistors 183a–d are coupled to a common line 68 which serves as the summing network shown in FIG. 7. When coupled to the reference output F from level control 71 an error signal is produced on line 72 which drives the motor driver 73 of FIG. 7.

Thus, the present invention provides a serial printer which has high graphic quality, fast operation and quietness. It achieves the foregoing by a minimum of high speed moving mechanical parts. More specifically, character selection and column selection are accomplished with electronic servo systems. These servos include non-contacting type electromagnetic position transducers which have virtually infinite life expectancy.

The present system also provides great flexibility in operation, even including the ability to print from right to left.

The use of servo system for both carriage movement and print wheel movement allows an effective means of intermittently moving both the carriage and print wheel. This thus eliminates on-the-fly printing and its attendant reduction in printing quality. At the same time, it allows for even higher speed printing since the spokes of the printing wheel may be strengthened in a rotary direction since they do not need to bend as was necessary in prior art on-the-fly printing. Thus, good registration is achieved even with the higher previously unobtainable printing speeds; for example, the printing speed of the present device is typically 30 characters per second.

I claim:
1. An impact printer for printing characters serially on a record medium comprising:
   a carriage;
   a print wheel rotatably mounted to said carriage and including a plurality of character elements;
   first drive means coupled to said print wheel for rotating said print wheel to a desired rotational position in order to place a selected character element at rest in a printing position adjacent a record medium to be printed upon;
   print hammer means mounted on said carriage and adapted to impact a selected character element while said character element is at rest in a printing position in order to print on the record medium;
   second drive means coupled to said carriage for moving said carriage linearly along a predetermined path whereby said print wheel and said print hammer means are caused to move to printing positions along said path; and
   first servo control means coupled to said first drive means for controlling the rotation of said print wheel, said first servo control means including means coupled to said print wheel for generating a position signal indicative of the rotational position of the print wheel, means responsive to the rotation of said print wheel for generating a velocity signal indicative of the instantaneous velocity of the print wheel, and means coupled to said means for generating a position signal and said means for generating a velocity signal for energizing said first drive means first in accordance with said velocity signal until the print wheel is driven to a homing region relative to said desired rotational position and then in accordance with said position signal and said velocity signal as the print wheel is driven further through said homing region to said desired rotational position.

2. The impact printer of claim 1, wherein said means for generating a velocity signal includes means coupled to said means for generating a position signal for deriving said velocity signal from said position signal.

3. The impact printer of claim 1, wherein said means for generating a position signal includes a position transducer coupled to said print wheel for generating a pair of phase-displaced signals.

4. The impact printer of claim 3, wherein said pair of phase-displaced signals are each modulated carrier waves and said first servo control means further includes means for demodulating each of said pair of phase-displaced signals.

5. The impact printer of claim 4, wherein said means for generating a velocity signal includes means coupled to said means for demodulating for deriving said velocity signal from said pair of demodulated phase-displaced signals;

6. The impact printer of claim 5, wherein said first servo control means further comprises:

means coupled to said means for demodulating and responsive to a signal indicative of the rotational distance of the print wheel remaining until said desired rotational position is reached for generating a command signal indicative of a desired velocity of rotation of said print wheel;

means coupled to said means for generating a velocity signal and said means for generating a command signal for summing said velocity and command signals to generate an error signal representative of such summation; and means for coupling said error signal to said first drive means.

7. The impact printer of claim 6, wherein said first servo control means further comprises means coupled to said means for demodulating and responsive to a signal indicative of the rotational distance of the print wheel remaining until said desired rotational position is reached for coupling one of said pair of demodulated phase-displaced signals to said means for summing when said print wheel has been rotated to said homing region, said one of the pair of demodulated phase-displaced signals constituting said position signal.

8. The impact printer of claim 1, wherein said first servo control means further comprises:

means coupled to said means for generating a position signal and responsive to a signal indicative of the rotational distance of the print wheel remaining until said desired rotational position is reached for generating a command signal indicative of a desired velocity of rotation of said print wheel;

means coupled to said means for generating a velocity signal and said means for generating a command signal for summing said velocity and command signals to generate an error signal representative of such summation; and means for coupling said error signal to said first drive means.

9. The impact printer of claim 1, further comprising second servo control means coupled to said second drive means for controlling the movement of said carriage, said second servo control means including means coupled to said carriage for generating a second position signal indicative of the linear position of the carriage along said predetermined path, means responsive to the linear movement of said carriage for generating a second velocity signal indicative of the instantaneous velocity of the carriage, and means coupled to said means for generating a second position signal and said means for generating a second velocity signal for energizing said second drive means first in accordance with said second velocity signal until the carriage is driven to a second homing region relative to a desired linear position and then in accordance with said second position signal and said second velocity signal as the carriage is driven further through said second homing region to said desired linear position.

10. The impact printer of claim 7, wherein said means for generating a command signal includes means for varying the level of said command signal in dependence upon the rotational distance of the print wheel remaining until said desired rotational position is reached.

* * * * *

UNITED STATES PATENT AND TRADEMARK OFFICE
CERTIFICATE OF CORRECTION

PATENT NO. : 3,954,163
DATED : May 4, 1976
INVENTOR(S) : Andrew Gabor

It is certified that error appears in the above-identified patent and that said Letters Patent are hereby corrected as shown below:

In column 1, delete lines 22 - 26 and on line 27, delete "ABLE MEMBERS and".

In column 1, line 58, insert -- a high speed printer for printing on a record medium comprising -- before "a carriage".

In column 2, line 15, change "predetermined rotational position" to -- homing region -- and on line 18, add -- through the homing region -- after "further".

Signed and Sealed this

Thirty-first Day of August 1976

[SEAL]

Attest:

RUTH C. MASON
*Attesting Officer*

C. MARSHALL DANN
*Commissioner of Patents and Trademarks*